United States Patent [19]
Nordli et al.

[11] 3,809,526
[45] May 7, 1974

[54] HEATING UNIT

[76] Inventors: Bjarne Nordli, Hammerstad, 2080 Eidsvoll; Tor Audun Oftedal, Holtegt 24, Oslo 3; Erik A. Wulvik, Odalsgt 4,, 2000 Lillestrom, all of Norway

[22] Filed: May 3, 1973

[21] Appl. No.: 356,990

[52] U.S. Cl................... 432/36, 126/206, 126/263, 136/181
[51] Int. Cl............................................. F27b 17/00
[58] Field of Search.......... 432/9, 36; 126/204, 206, 126/207, 363; 136/181

[56] References Cited
UNITED STATES PATENTS

| | | | |
|---|---|---|---|
| 3,229,681 | 1/1966 | Gluckstein | 126/204 |
| 3,725,153 | 4/1973 | Schroder et al. | 126/263 |
| 3,158,363 | 11/1964 | Breckenridge | 432/36 |
| 3,527,925 | 9/1970 | Toyooka et al. | 136/181 X |

*Primary Examiner*—John J. Camby
*Attorney, Agent, or Firm*—John T. O'Halloran; Menotti J. Lombardi, Jr.; Peter C. Van Der Sluys

[57] ABSTRACT

Heating unit suitable for being placed in thermal contact with an object to be heated, that comprises a fuel element substantially consisting of carbon and which is arranged in a box of heat conducting material with a layer of heat insulating material between the fuel element and the box, ignition means and air supply means arranged to supply combustion air during and after ignition, so that the air flow is defined resulting in predetermined heat effect.

14 Claims, 6 Drawing Figures

HEATING UNIT

The present invention relates to heating units which are suitable for being placed in thermal contact with an object to be heated.

The object of the present invention is to provide a heating unit which has low weight and small dimensions. It should also have simple and reliable design making it suitable for use in portable equipment, and for other purposes where the weight of the heating unit and its small dimensions are of substantial importance.

A particular object of the present invention is to provide heating unit suitable for heating batteries in portable equipment.

In U.S. Pat. No. 2.615.933 there are mentioned previously known battery heating systems based on electrical heating units and pads, as well as circulation of heated fluids in pipes arranged inside or around the battery. Such systems are, however, considered to be unsuitable for many purposes.

In said patent there is also mentioned a battery heater comprising a heating element, which produces heat by combustion of solid fuel. The object of this system is to give the electrolyte of the battery rapid rise of the temperature, the battery walls being provided with channels for distribution of the heat. The suggested heating elements are heat generating cartridges comprising a mixture of an oxidable metal powder and an oxidizing agent, and the selection of these substancies determines the generated heat. In this type of battery heater there exists no possibilities of controlling the combustion when this has been started, and the fuel will be combusted within a short time period, of the order of one minute. Furthermore, such battery heaters will be relatively heavy in relation to the generated heat.

The present invention is, however, not limited to heating units for batteries, and the main feature of the invention is that the heating unit comprises a fuel element substantially consisting of carbon and which is arranged in a box of heat conducting material with a layer of heat insulating material between the fuel element and the box, ignition means and air supply means arranged to supply combustion air during and after ignition, so that the air flow is defined resulting in predetermined heat effect.

A further feature of the invention is that the heating unit further comprises temperature detection means arranged in close contact with the object to be heated, and switching means controlled by the temperature detection means to control the flow of air supplied by the air supply means, while maintaining a certain minimum flow for the life of the fuel element, thereby controlling the rate at which the fuel element is combusted.

A further feature of the invention is that the air supply means comprises a motor driven fan, which is operated from a battery, preferably being a conventional drycell battery.

By using termostatic regulation, the combustion may be made very slow, of the order of several days.

The fuel element is preferably made from carbon with additions of binders and combustion catalysts pressed into briquettes. There is obtained high combustion heat, about 8 kcal/g, as compared to 2 kcal/g by using pyrotechnical cartrigdes consisting of oxidizible metal and oxidizing agent.

Further advantages when using carbon, as compared to hydroncarbons are that the exhaust gases have a low content of humidity, i.e., a dew point of about 10° C as compared to about 60° C by combustion of hydrocarbons. This is of great importance when using the heater at low temperatures, as the tendency of icing is reduced and there will be negligable problems due to plugging of the exhaust outlet.

Use of carbon in the above mentioned form is of particular advantage because the exhaust gases are odorless, smokeless and non-poisonous as the contents of hazardous gases like carbonmonoxide is extremely low.

Use of carbon is also very advantageous because it is cheap and not fire-hazardous by storage. Furthermore the carbon may be stored in indefinite time without being detrimented.

Above mentioned and other objects and features of the present invention will clearly appear from the following detailed description of several embodiments of the invention, taken in conjunction with the drawings, where FIG. 1 is a chart showing the available energy as a function of temperature for three types of batteries, FIG. 2 is a block diagram showing the principle of using a heating unit for heating an object, e.g. a battery.

At low temperatures battery heaters may be used to keep the batteries in, i.e., battery operated radio-transmitters or the like, which are used outdoors at such a temperature that the available energy of the batteries may be fully utilized. The available energy of most battery-systems decreases rapidly with temperature. The ability of the batteries to deliver their energy within a short time interval is also greatly reduced at low temperatures.

Figure 1:
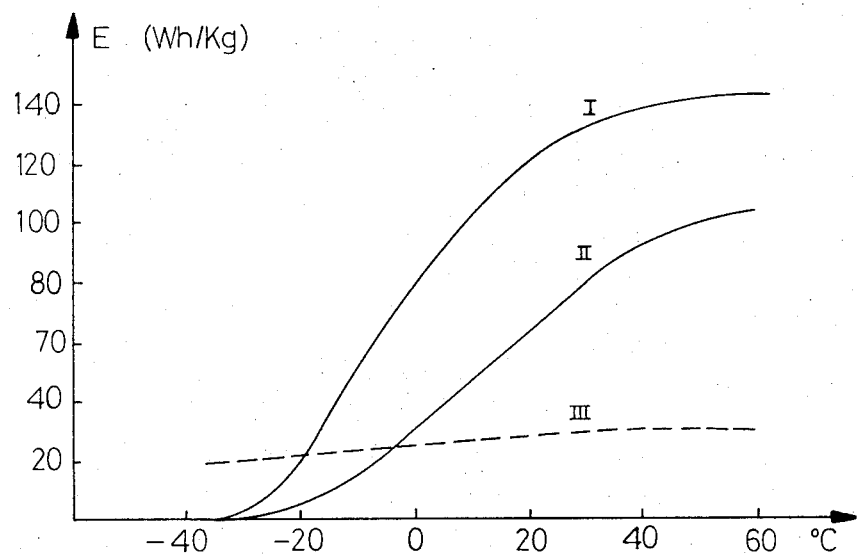

In FIG. 1 is shown a diagram illustrating the available energy as function of temperature for three types of batteries, curve I represents magnesium batteries, curve II represents a dry battery and curve III represents a lead-azid battery. The energy E represents the available energy per unit of weight (Wh/kg). It appears that the available energy from lead-azid battery is relatively constant at varying temperature, but the energy density is relatively low. The available energy for magnesium batteries and dry batteries decreases rapidly when the temperature decreases from about 20° C. When the temperature is lower than about −20°, the available energy from these batteries is negligble.

As is seen from the curves, the available energy from the two last mentioned battery types at higher temperatures, is relatively high per unit weight, and this is the reason why these battery types are particularly suitable for battery driven, portable equipment. It further appears that it is important to keep the temperature of these batteries relatively high (40°–60° C) in order to get more energy from the batteries.

Figure 2:
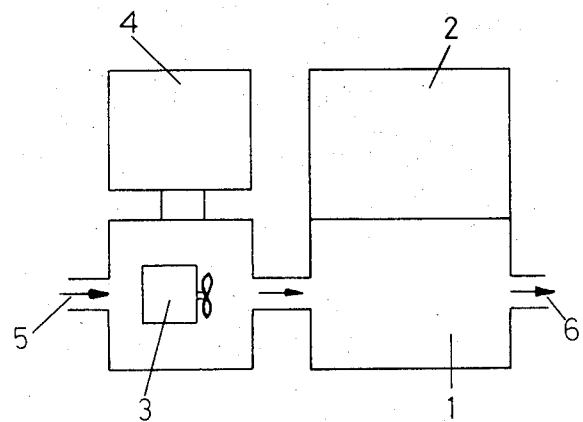

In FIG. 2 is shown a principle block diagram of a heating unit according to the present invention. As shown, an oven 1 is placed in thermal contact with an object 2 to be heated. In the following description of FIG. 2 and 3 the object to be heated will be referred to as a battery.

Figure 3:
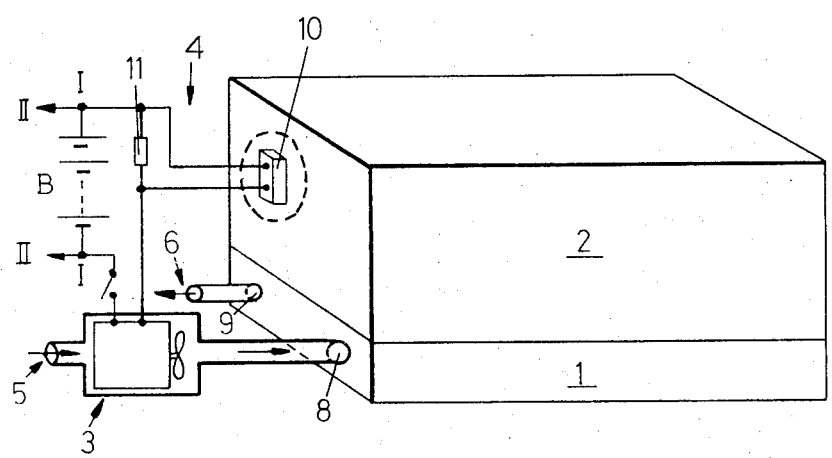
FIG. 3 shows in more detail the heating unit arrangement.

In FIG. 3 is schematically shown an embodiment of a battery heater. In FIG. 2 and 3 corresponding parts are given the same reference numerals. In the shown embodiment, the heating element 1 of the oven consist of a fuel element or carbon rod package, which is placed in a flat box of a material having well heat-conducting properties.

Between the fuel unit and the box there are arranged pads of heat insulating material, as e.g. rock wool. This insulating material has a heat distributing effect so that an even temperature is obtained on the surface of the box. In the embodiment shown in FIG. 3 the batteries to be heated are placed in a so-called battery-package above and in contact with the oven or the heating element element 1. In this case it will obviously be provided for good heat insulation on the low side of the heating unit, so that the heat is conducted from this side upwards to the battery package. Alternatively the heating element may be placed vertically, there being placed suitable compartments on each side of the element into which compartment batteries to be heated may be placed. Obviously other objects requiring heating may be placed in such compartments and also above the heating element.

Figure 4:
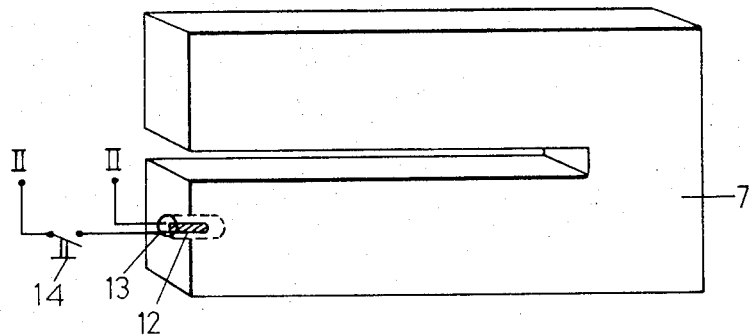
FIG. 4 shows one embodiment of the fuel element.

In one embodiment of the fuel element, this is substantially U-shaped as shown by reference numeral 7 in FIG. 4. The element is made of carbon with addition of an odorless binding agent, and reinforced so that it will not easily break. The armouring may consist of e.g. metal wire, glassfibres or textile fibres. The legs of the U-shaped fuel element extend towards the same side or ends of the box in which the element is placed and as shown in FIG. 3 there is in this end of the box, at the ends of the respective legs, arranged openings 8, 9 for supply of air and for outlet of exhaust gases.

There should preferably be arranged air paths between the air inlet 8 and the outlet 9, alongside the fuel element so that this element is combusted successively along these paths from the inlet to the outlet. The air paths may be arranged so as to follow the shape of the fuel element, and may either consist of channels in the element itself or in channels made in the insulating material surrounding the fuel element. Air supply means 3 which in this case is a fan arrangement, is driven from a low power motor (not shown) supplying voltage for a battery B. This battery may alternatively be constituted by an interconnection of the batteries of the battery package 2. It should then be arranged for suitable connections (not shown) for interconnection of the individual battery elements and for connection with the terminals I—I in FIG. 3. When the oven is placed vertically and the battery package 2 is placed in compartments containing a number of separated battery elements, the interconnection of the battery elements may be obtained by a lid having suitable terminals placed on top of the battery package, so that the terminals touch the poles of the elements and such that there by means of interconnections to terminals in the bottom of the individual compartments there is obtained interconnection of the battery elements.

A unit 4 for temperature control of the fan motor speed, is in FIG. 3 shown to be provided by a parallel connection of a heat detection element 10 and a resistance 11. This parallel connection is connected to the battery B in series with the fan motor. The temperature detector may be of a conventional type making contact under a certain temperature level, and which is open above this level. The temperature detector 10 is arranged at such a place in the battery package that it senses a temperature which is representative for the temperature of the batteries or objects to be heated. The operation of the control unit shall be described later.

For ignition of the fuel element there may be used an electrical match or fuse head. As shown in FIG. 4, there is in the part of the fuel element 7 close to the air inlet 5 in FIG. 3, arranged a hollow 12 into which an ignition cartridge and a fuse head 13 may be arranged. The powder ignitor is by a switch 14 connected to terminals II—II interconnected with the terminals of the battery heater.

The previously described elements of the heater are placed in a box (not shown), made of, i.e., aluminium. The elements placed in the box are thermally insulated by means of insulation compound. Usually there will also be arranged external terminals on the battery package 2 (not shown), for connection to external equipment which is to be driven by the batteries.

The combustion is started by closing the switch 14. Simultaneously the fan 4 is started for supply of combustion air from the air inlet 5 to the fuel element via the opening 8. The exhaust gases arising from the combustion are conducted to the outlet 6 via the opening 9. As long as the temperature dectector 10 senses a temperature below a certain level, the contact of the detector is closed. The resistance 11 is short circuited, and the fan motor is operated at full speed. The speed of combustion and the active power of the oven is maximum. When the desired temperature is reached, the contact of the detector 10 is opened, whereby the resistance 11 is connected into the circuit, and the motor speed will be reduced. The value of the resistance may be chosen so as to obtain a suitable heat effect, i.e., correct heat and constant temperature. The resistance 11 may for this purpose be made controllable.

Figure 5:
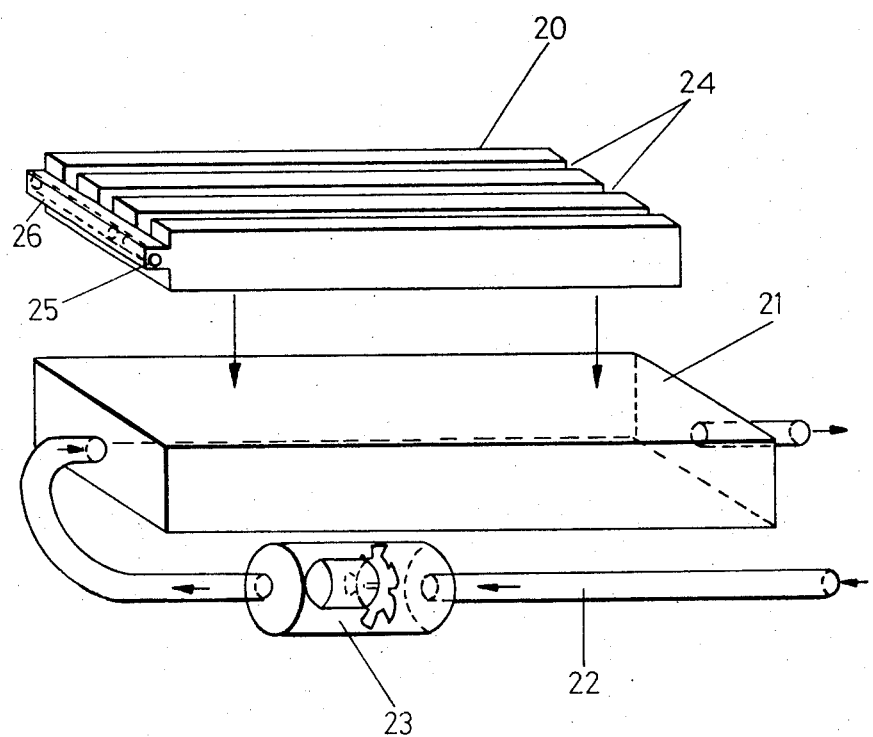
FIG. 5 shows another embodiment of the fuel element and other elements of the battery unit.

In FIG. 5 is shown an alternative embodiment of the heater by using a substantially rectangular fuel element 20 which is placed in a box 21, and where the combustion air is supplied via a pipe 22. A fan arrangement is indicated at 23. Alternatively the air flow may be made in the reverse direction. As shown the fuel element 20 is provided with air channels or paths 24 while the ignition means indicated at 25 is placed in a ridge like part 26 of the fuel element. The ignition means is mounted in a hollow provided right below the surface of the fuel element, so that at least part of the fuel element close to the ignition means is thin walled, thereby ensuring that at least part of the outer surface of the fuel element will be ignited by heat from the igntion means.

As shown the air inlet and the gas outlet is arranged on the same side of the heater. Productional advantages are obtained by making the fuel element in the form of a single rod.

By having the air inlet and the exhaust gas outlet arranged on the same side there is obtained an ideal control of the air flow in the heater, because a straight line airflow from input to output would be very sensitive to environmental wind conditions. The combustion speed will therefore only to a negligable extent be disturbed by environmental conditions.

The described embodiment of the invention and alternative embodiments may be used for many purposes. The heater may, i.e., be used in an ambulance stretcher to keep injured persons warm after axidents. The heater will in these cases be of particular importance for shock injured patients which have lost their natural heat controlling ability and where heat is of vital importance.

Figure 6:
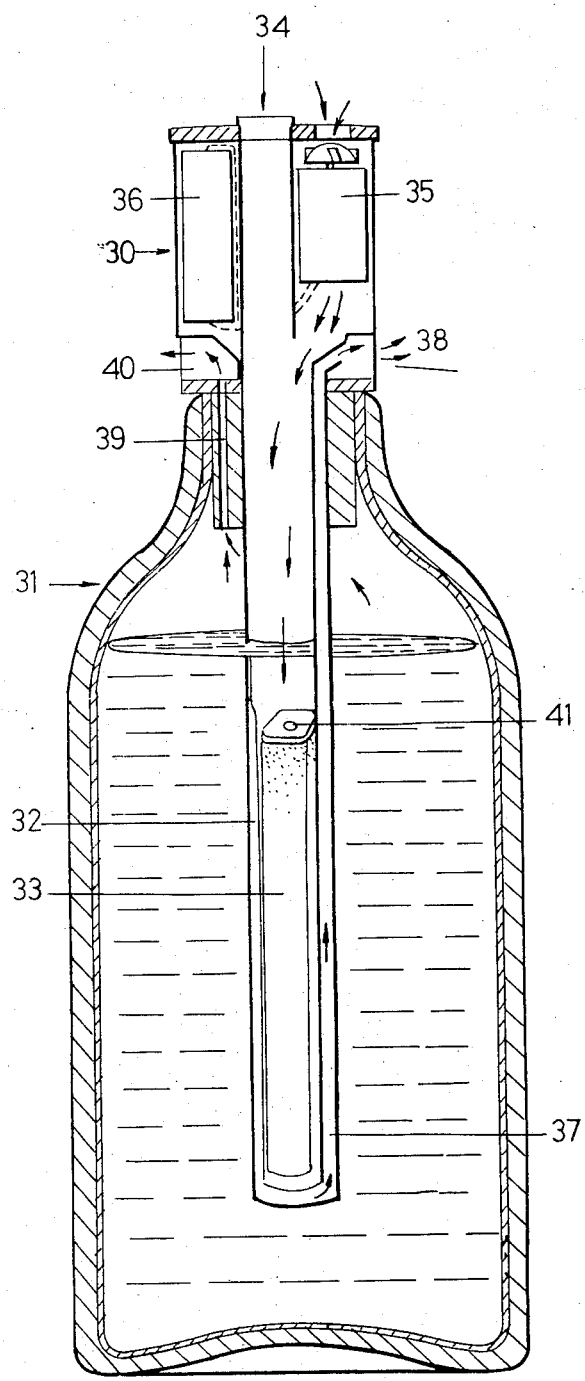
FIG. 6 shows a third embodiment of the invention as adapted for heating of the contents in a thermobottle.

In FIG. 6 is shown an alternative embodiment of the invention where the heater is used as a dip boiler. As shown the heater is built into the closing means 30 of a bottle 31. The fuel element box is constituted by a compartment 32 into which the fuel element 33 may be slipped from the top after removal of a cork 34. The fan motor 35 and the battery 36 is placed in the upper part of the closing means 30. The inlet of the combustion air is at the fan 35, the air flow passing downward through the fuel element 33 to the bottom of the compartment, whereafter it passes upwards in an exhaust channel 37 to the outlet 38. When the contents of the bottle is heated excessive vapor will escape via an outlet 39 to a vapor outlet 40.

The fuel element may be ignited before it is dropped down into the compartment 32 by operating the ignition means 41 in one end of the fuel element. There is obtained a high degree of efficiency of the dip boiler when the bottle is well heat insulated. It may, i.e., be a so-called thermobottle. It is expected that the dip boiler described will be of particular advantage when used in free air and also in connection with marine life saving equipment for e.g. distillation of sea water. While temperature regulations may be desirable in most cases, it may in some cases be allowable to omit the temperature and controlling means.

We claim:

1. Heating unit suitable for being placed in thermal contact with an object to be heated, said unit comprising: a fuel element substantially comprising carbon; a box of heat conducting material for housing the fuel element; a layer of heat insulating material between the fuel element and the box; ignition means for igniting the fuel element; and air supply means for supplying combustion air to the fuel element during and after ignition, so that an air flow is provided to sustain combustion of the fuel element to provide heat to the object to be heated which is placed in thermal contact with the box.

2. Heating unit according to claim 1, wherein the heating unit further comprises: temperature detection means arranged in close contact with the object to be heated; and means controlled by the temperature detection means for controlling the flow of air supplied by the air supply means, while maintaining a certain minimum flow for the life of the fuel element, thereby controlling the rate at which the fuel element is combusted.

3. Heating unit according to claim 1, wherein the air supply means comprises a motor driven fan, which is operated from a battery.

4. Heating unit according to claim 3, wherein the battery is a conventional drycell battery.

5. Heating unit according to claim 3, wherein the fan motor is connected in series with the battery and the heating unit additionally comprises: a resistance connected in series with the battery and motor; and switching means shunting said resistance, said switching means being controlled to short circuit said resistance at temperatures below a certain level.

6. Heating unit according to claim 5, wherein the object to be heated is an external battery, the external battery being connected to the switching means so as to be used alternately with the battery to operate the fan.

7. Heating unit according to claim 1, wherein the combustion air supply means and the fuel element are arranged relative to each other so that the air is forced to flow in the direction of combustion of the fuel element, so as to secure complete and successive combustion of the whole fuel element.

8. Heating unit according to claim 7, wherein channels, are provided in one of said fuel element and insulation material to facilitate the flow of air in the desired direction.

9. Heating unit according to claim 1, wherein the combustion air supply means and the fuel element are arranged such relatively to each other that the air enters the unit at the air supply means, and leaves the unit at the end of the fuel element.

10. Heating unit according to claim 1, wherein the combustion air inlet and the exhaust outlet are arranged side by side on the same side of the unit, so that the air flow is substantially U-shaped.

11. Heating unit according to claim 10, wherein the fuel element itself is U-shaped.

12. Heating unit according to claim 1, wherein the ignition means is mounted in a hollow provided below the surface of the fuel element, so that at least part of the fuel element close to the ignition means is thin walled, thereby ensuring that at least part of the outer surface of the fuel element will be ignited by heat from the ignition means.

13. Heating unit according to claim 12, wherein the ignition means is mounted in a part of the fuel element having reduced cross-section relative to the cross section of the main part of the fuel element.

14. Heating unit according to claim 1 adapted for heating the contents of a thermo bottle, wherein the heating unit is built into a bottle opening closing means, the fuel element box being formed as a dip heater which is arranged to be submerged into the bottle contents.

* * * * *

UNITED STATES PATENT OFFICE
CERTIFICATE OF CORRECTION

Patent No. 3,809,526                    Dated May 7, 1974

Inventor(s) B. Nordli-T.A. Oftedal-E.A. Wulvik

It is certified that error appears in the above-identified patent and that said Letters Patent are hereby corrected as shown below:

On the Title page, insert --

[73] Assignee: Forsvarets Forskningsinstitutt

[30] Foreign Application Priority Data
May 9, 1972        Norway.............1645/72

Signed and sealed this 29th day of October 1974.

(SEAL)
Attest:

McCOY M. GIBSON JR.
Attesting Officer

C. MARSHALL DANN
Commissioner of Patents